P. P. DEAN.
DRIVING MECHANISM FOR VALVES AND OTHER DEVICES.
APPLICATION FILED AUG. 12, 1916.

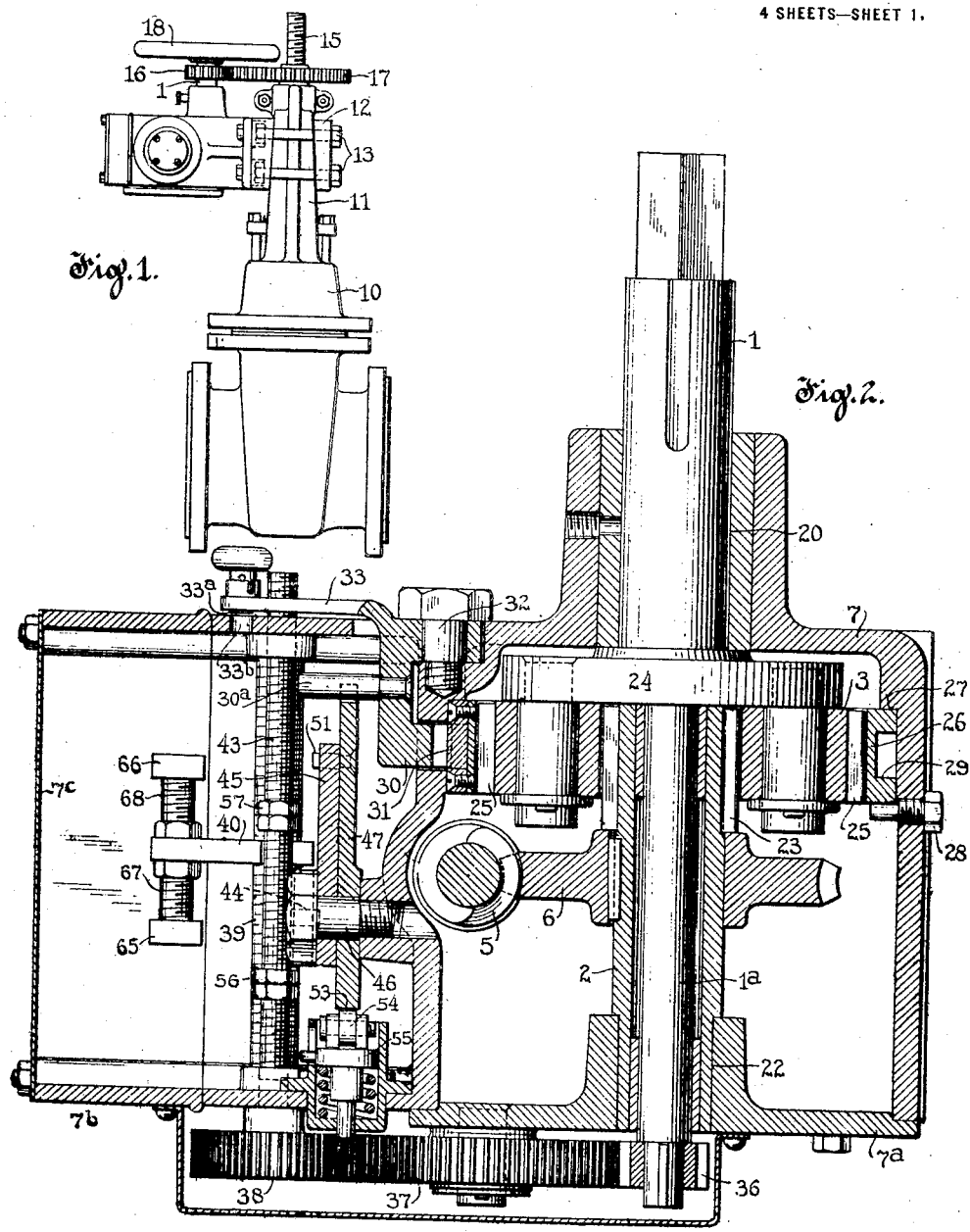

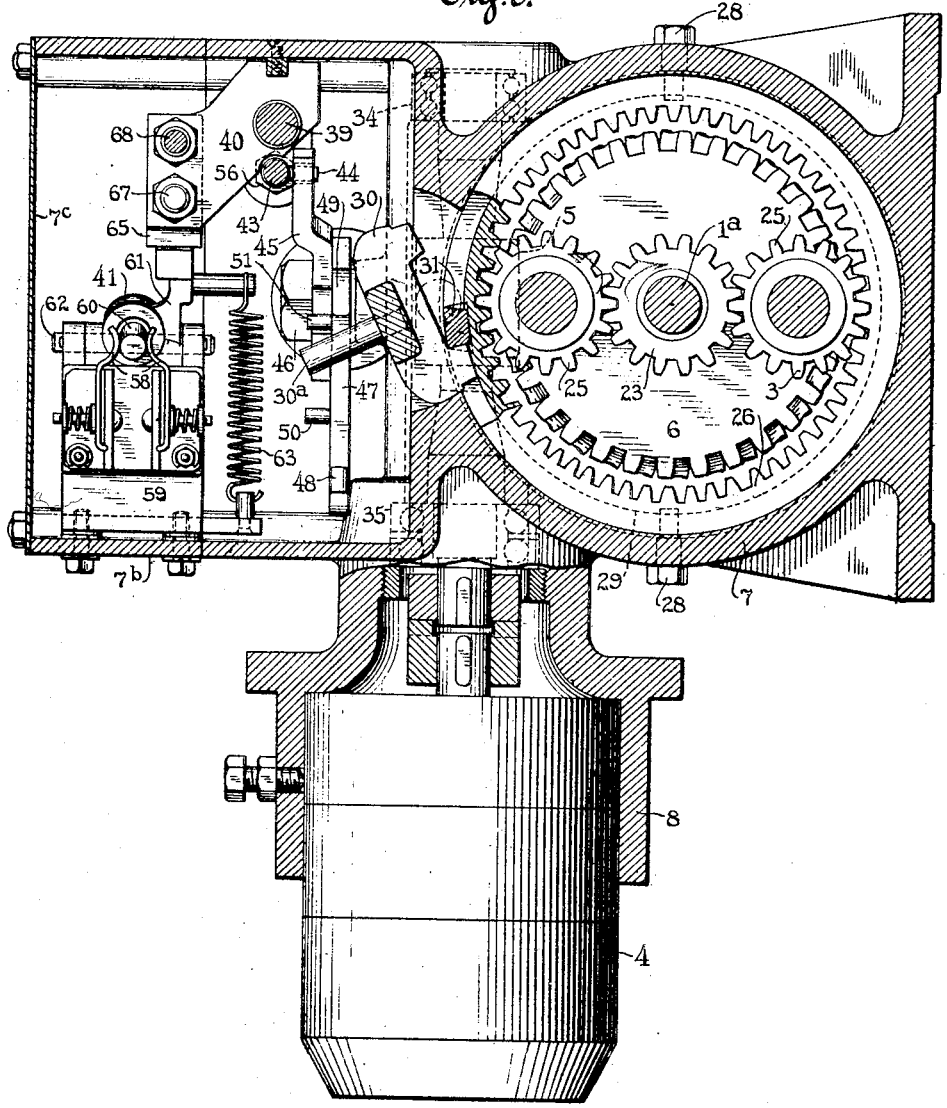

1,245,574.

Patented Nov. 6, 1917.
4 SHEETS—SHEET 3.

INVENTOR.
Peter P. Dean
BY Frank H. Hubbard
ATTORNEY

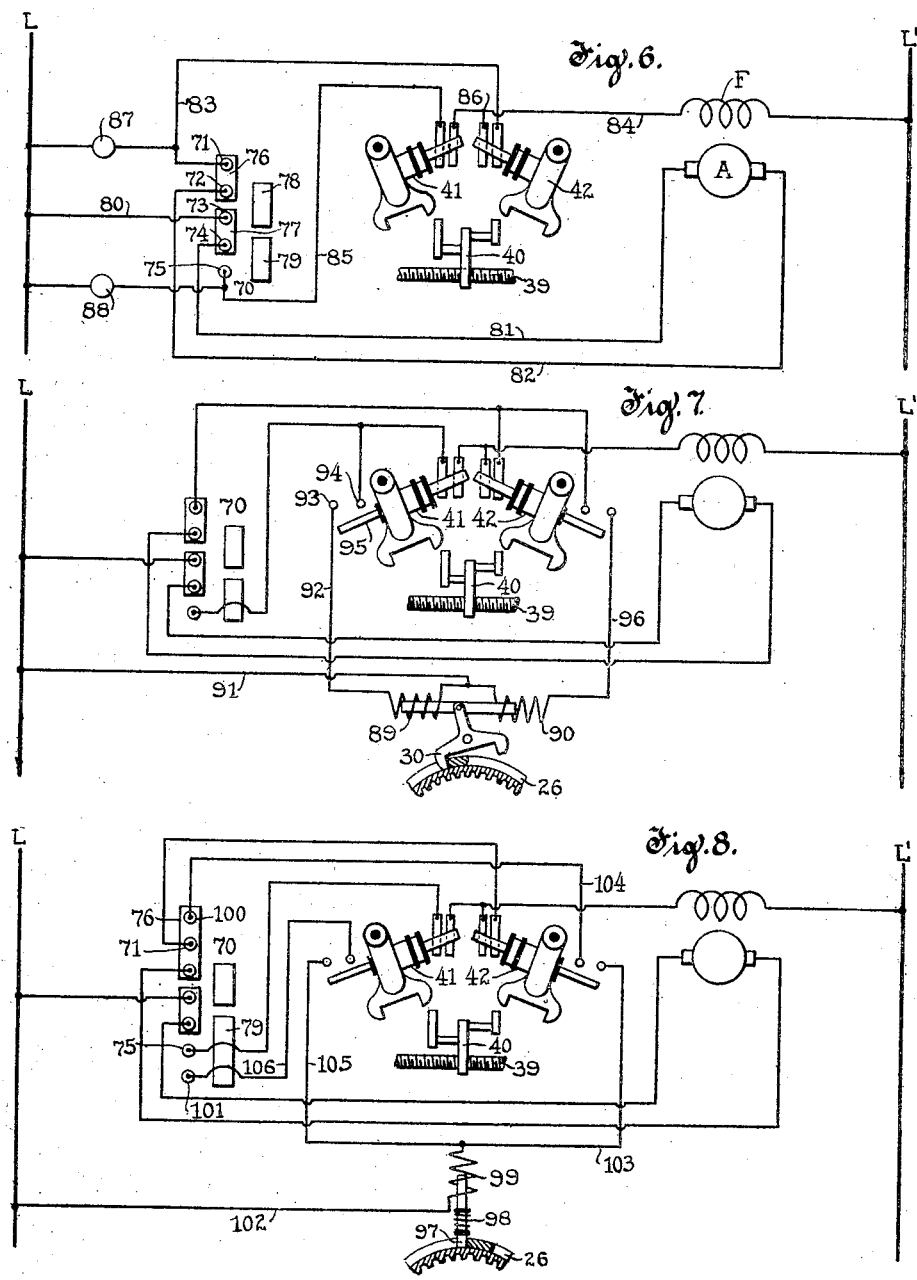

UNITED STATES PATENT OFFICE.

PETER P. DEAN, OF NEW YORK, N. Y.

DRIVING MECHANISM FOR VALVES AND OTHER DEVICES.

1,245,574.  Specification of Letters Patent.  Patented Nov. 6, 1917.

Application filed August 12, 1916. Serial No. 114,539.

*To all whom it may concern:*

Be it known that I, PETER P. DEAN, a subject of the King of England, residing at New York city, in the county of New York and State of New York, have invented new and useful Improvements in Driving Mechanisms for Valves and other Devices, of which the following is a full, clear, concise, and exact description, reference being had to the accompanying drawing, forming a part of this specification.

This invention relates to driving mechanisms for valves and other devices.

In the control of valves and various other devices it is essential to provide for full operation thereof, while on the other hand, it is equally essential to prevent undue jamming of the same at their limits of movement, and heretofore it has been common practice to provide for such devices either a slip clutch drive or a motor drive wherein the motor is disconnected from circuit prior to the attainment of limits. The former drive is unreliable, being dependent upon a fine adjustment of the slip clutch and the latter drive is unreliable, being dependent upon the momentum of the motor for final positioning of the driven device and upon a limited momentum to prevent jamming. Moreover, the latter and more common drive has entailed the use of a relatively large slow speed motor and a more or less elaborate and expensive controller therefor.

The present invention has among its objects to provide a more reliable, simple and inexpensive driving mechanism and one whereby positive operation of the driven device may be continued to the limit of travel thereof and thereupon substantially instantaneously terminated.

A further object is to provide a driving mechanism enabling the use of a relatively small high speed motor for driving purposes.

A further object is to provide a driving mechanism to impart a hammer blow to the driven device both for initiation and completion of its movement.

A further object is to provide a driving mechanism wherein either mechanical or electromagnetic means may be employed for effecting termination of the power drive.

A further object is to provide a driving mechanism wherein the driven member may be readily freed from the driving motor for manual operation in emergencies.

A further object is to provide a driving mechanism of compact unit form which may be readily attached to the valve or other device to be driven thereby and readily adapted to various existing valves and other devices.

Other objects and advantages of the invention will hereinafter appear.

The accompanying drawing illustrates one embodiment of the invention together with certain modifications thereof which will now be described, it being understood that the invention may be embodied in other forms falling within the scope of the appended claims.

In the drawings,

Figure 1 is an elevation of a valve equipped with the driving mechanism illustrated in detail in other views.

Fig. 2 is a vertical sectional view through the driving mechanism shown in Fig. 1.

Fig. 3 is a vertical sectional view through the same mechanism but in a plane at right angles to that of Fig. 2.

Fig. 6 is a diagrammatic view of a control system for the mechanism; and,

Figs. 7 and 8 illustrate certain modifications of the mechanism and modified control systems therefor.

Figure 4:
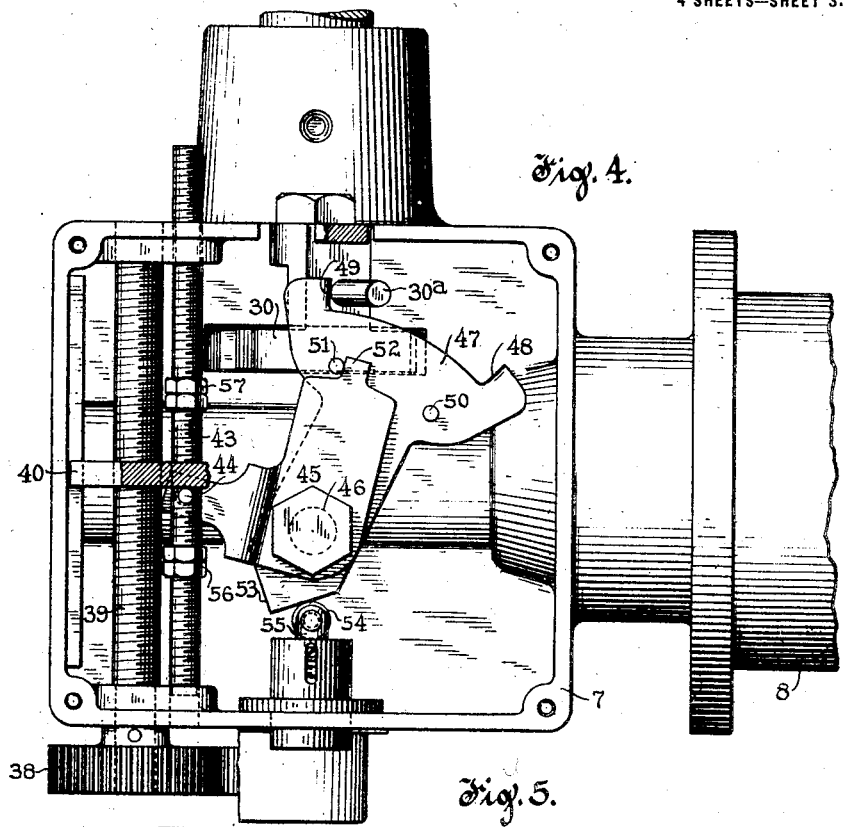
Fig. 4 is a plan view of a part of the limit means of the mechanism.
Figure 5:
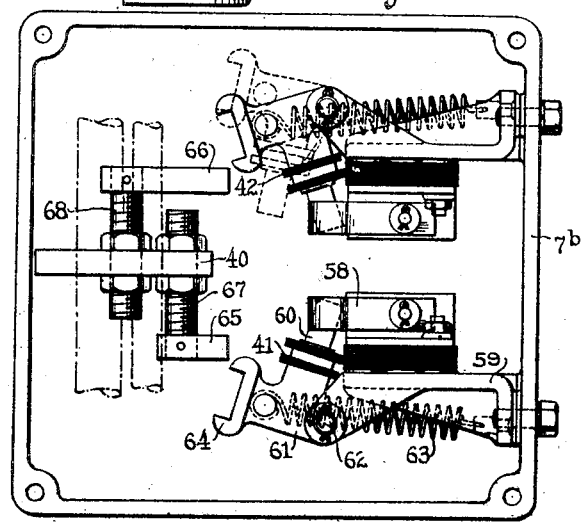
Fig. 5 is a plan view of another part of the limit means.

The mechanism shown in Figs. 1 to 5 includes a driven shaft 1, a driving shaft 2, a planetary speed reducing gear 3 connecting the same and a relatively small high speed driving motor 4 (Fig. 3) operatively connected to the driving shaft 2 through a worm 5 and worm wheel 6 (Fig. 5). The shafts and their gears are all mounted in a casing 7 and the motor is mounted in a tubular extension 8 of said casing. The casing also carries certain limit means, hereinafter specified, which complete the driving mechanism, whereby, as illustrated in Fig. 1, the mechanism may be mounted as a unit upon a valve 10 or other device. The valve illustrated is of a common type and the driving mechanism is secured to the yoke 11 thereof by a clamping plate 12 and bolts 13, with its driven shaft 1 in a parallel relation to the valve stem 15 and provided with a pinion 16 fixed thereto to mesh with a gear 17 threaded onto the valve stem. As will be understood, rotation of the gear 17 effects reciprocation of the stem 15 to open or close the valve according to the direction of rotation of the gear 17 by the shaft 1. The shaft 1 is also provided with a hand wheel 18 (Fig. 1) whereby said shaft may be operated manually under the conditions hereinafter specified.

More specifically, the driven shaft 1 has a bearing 20 in a wall of the casing and an extension 1ᵃ projecting through the opposite wall of said casing. The driving shaft 2 is hollow and is mounted upon the extension 1ᵃ of the shaft 1, it being also provided at one end with a bearing 22 in a wall of the casing. The shaft 2 has the worm wheel 6 fixed thereto and also has fixed thereto a pinion 23 constituting one member of the planetary gear 3. The shaft 1 has fixed thereto a spider 24 carrying pinions 25 meshing with the pinion 23 on the shaft 2 and with an internally toothed ring 26 rotatably mounted within the casing 7. The ring forms a second member of the planetary gear and the pinions 25 form the planet members of said gear. The ring 26 is confined between an annular shoulder 27 provided within the casing and one or more studs 28 threaded through the wall of said casing and is provided with a peripheral groove 29. The groove 29 is provided to receive the extremities of a relatively stationary double pawl 30 (Fig. 3) and has therein a transversely extending block 31 with which the pawl functions as a stop for said ring. The pawl, which is mounted to rock upon a pin 32 (Fig. 2) is so arranged that when one extremity thereof is projected into the groove 29 the other is withdrawn therefrom. Thus the pawl may be rocked to lock the ring against rotation in either direction while permitting rotation thereof in a reverse direction to a degree corresponding to the length of the groove 29 which, as will be noted, permits of substantially a complete revolution of said ring. This type of gear, as above stated, provides for a reduced speed drive from the shaft 2 to the shaft 1 and as will be understood the effectiveness of said gear is dependent upon restraint of the ring 26, for when said ring is released the pinions 25 are permitted rotation upon their respective axes and accordingly without appreciable torque upon the shaft 1.

Thus with the motor driving the shaft 1 in either direction through the planetary gear, said shaft may be substantially instantaneously released from the motor by merely rocking the pawl 30 out of the path of the block 31. Accordingly by shifting the pawl at critical moments the valve may be positively driven to its limits and then instantaneously released from the motor to insure against over-travel and undue jamming thereof. Then if the motor be disconnected from circuit simultaneously with the termination of the drive, its momentum may be utilized to continue the rotation of the ring of the planetary gear to reëngage the block 31 with the depressed extremity of the pawl to thereby impart a hammer blow to the valve for final positioning thereof. Moreover, if the ring be rotated to function as just described, it will be observed that upon starting the shaft 1 in a reverse direction said ring must make a substantially complete revolution prior to arrest thereof by the pawl. This enables the motor to accelerate with practically no load and to acquire sufficient momentum to initiate the operation of the shaft 1 with a hammer like blow through the sudden arrest of the ring.

The pawl 30 is also operable by means of a handle 33, Fig. 2, to a neutral position in which both of its extremities are withdrawn from the groove in the ring of the planetary gear. Such positioning of the pawl permits unlimited play of the ring in both directions and hence enables the driven shaft to be freely operated in either direction by the hand wheel 18. Also, the handle 33 is provided with a pin 33ᵃ adapted to be projected into a socket 33ᵇ on the casing to retain the pawl in neutral position during such manual operation.

The shafts and gears described are adapted to be inserted within the casing through a side opening provided by a removable section 7ᵃ of the casing which carries the bearing 22 for the driving and driven shafts. The motor 4 is mounted with its shaft at right angles to the driving and driven shafts and said motor shaft has ball bearings 34 and 35 in opposite walls of the casing. The worm 5 is fixed to the motor shaft between said bearings and is of a diameter permitting its insertion through the bearing 35. The parts may thus be readily assembled and the casing filled with lubricant for the inclosed gears.

The extension 1ᵃ of the driven shaft 1 projects through the casing 7 (Fig. 2) and is geared through a pinion 36, an idle gear 37 and a pinion 38 to a threaded shaft 39 driving a traveling member 40 of the limit mechanism, above mentioned. The limit mechanism is mounted in the upper parts 7ᵇ of the casing beneath a removable cover 7ᶜ and includes means under the control of member 40 to shift the pawl 30 and switches 41 and 42, also under the control of member 40 to interrupt the circuit of the driving motor.

The pawl shifting means includes a rod 43 (Figs. 3 and 4) slidably mounted within the casing in a parallel relation to the shaft 39 and operatively connected by a pin 44 to a bell crank lever 45. The lever 45 is fulcrumed upon a stud 46 disposed perpendicularly to the pivot of the pawl 30 and coöperates with a second lever 47 also fulcrumed upon the stud 46 to act directly upon the pawl 30. The lever 47 has spaced lugs 48 and 49 straddling a radial lug 30ª of the pawl 30 to shift said pawl upon oscillation of said lever and spaced pins 50 and 51 straddling an extension 52 of the lever 45 to provide a lost motion connection between said levers. Further, the lever 47 has a cam extremity 53 engaged by a roller 54 carried by a spring pressed plunger 55, the arrangement being such as to insure oscillation of the lever 47 with a snap action to shift the pawl 30 by hammer blows. As will be understood the sliding rod 43 constitutes the actuating part of the means described and through oscillation of the pawl 45 initiates and continues the movement of the lever 47 in both directions until the crest of its cam extremity 53 passes the axis of the roller 54, whereupon the drive of the lever 47 is transferred to the spring pressed plunger 55. The rod 43 is threaded and has threaded thereon two stops 56 and 57 in the path of the traveling member 40 (Figs. 2 and 4) and as will be apparent the pawl shifting means is thereby placed under the control of the traveling member 40. That is to say, if the traveling member 40 be moved upwardly it will engage the stop 57 to move the rod 43 in the same direction and through the medium of levers 45 and 47 shift the pawl in a corresponding direction, whereas if it be moved downwardly it will move the rod 43 in a reverse direction to shift the pawl in a reverse direction. Hence by adjusting the stops 56 and 57 relatively to the traveling member, allowance being made for the lost motion in the connections between rod 43 and the pawl 30, said pawl may be automatically shifted simultaneously with the attainment of limits by the valve.

The limit switches 41 and 42 are both of the same construction and are of a conventional type. Referring to switch 41, the same includes a relatively stationary contact 58 carried by a bracket 59 fixed to a wall of the casing and a coöperating movable contact 60 carried by a bell crank lever 61 fulcrumed upon said bracket at 62 and provided with a coiled tension spring 63 also connected to said bracket. The spring 63 is so connected to said lever and bracket as to be shiftable across the fulcrum point 62 upon oscillation of the lever, thereby providing for actuation of said lever to engage and disengage the contacts with a snap action. Each lever 61 has a forked extremity 64 and the traveling member 40 is provided with pawls 65 and 66 to coöperate with said forked parts of the switches 41 and 42 respectively. The arrangement is such that upon movement of the member 40 in opposite directions from an intermediate position it will selectively engage and actuate the levers of the two switches to set the same for quick opening thereof by their springs 63. Also, the arrangement is such that upon return movement of the member 40 after effecting opening of either switch it will immediately set the lever of such switch for reclosure thereof by its spring 63. The pawls 65 and 66 are connected to the member 40 by threaded spindles 67 and 68 respectively, which provide for adjustment thereof relatively to said member. Accordingly by proper adjustment of the pawls 65 and 66 automatic opening of each of the switches 41 and 42 may be effected simultaneously with the shifting of the pawl 30 whereby the motor may be disconnected from circuit as shown in Fig. 6, simultaneously with the release of the driven shaft from the driving shaft.

Referring to Fig. 6, the driving motor is diagrammatically shown as provided with an armature A and series field winding F. It is jointly controlled by the limit switches 41 and 42 and a reversing drum controller 70, said switches and controller being shown schematically. The controller 70 comprises a series of contacts 71 to 75 and two sets of coöperating contact segments to be alternatively engaged therewith. One set includes a segment 76 to bridge contacts 71 and 72 and a segment 77 to bridge contacts 73 and 74 while the other set includes a segment 78 to bridge contacts 72 and 73 and a segment 79 to bridge contacts 74 and 75. With both limit switches closed and with the segments in the position illustrated, circuit may be traced from line L by conductor 80 to contact 73 through segment 77 to contact 74, by conductor 81 through the motor armature from left to right, by conductor 82 to contact 72 through segment 76 to contact 71, by conductor 83 through limit switch 42, by conductor 84 through the series field winding F to line L'. This provides for operation of the motor in one direction and for continued operation thereof until the traveling member 40 shifts the pawl 30 to interrupt the mechanical drive and to simultaneously open the switch 42 thereby interrupting the motor circuit, whereupon the motor will drift as above described to impart a hammer blow to the valve for final positioning thereof. To operate the valve in the reverse direction the controller drum must be moved to disengage segments 76 and 77 from the contacts and to engage segments 78 and 79 with said contacts. This will complete the motor circuit from line L by conductor 80 to contact 73 through segment 78 to contact 72 by conductor 82 through the motor armature from right to left, by conductor 81 to contact 74 through segment 79 to contact 75, by conductor 85 through limit switch 41, by conductors 86 and 84 through the series field F to line L'. Such connections provide for reversal of the flow of current through the armature and accordingly reverse movement of the valve subject to operation of the member 40 to again shift the pawl 30 for interruption of the mechanical drive and to simultaneously open the limit switch 41 with the result already described. The controller 70 may, of course, be operated to stop and start the motor at will between limits and to indicate the position of the valve lamps 87 and 88 are provided. The lamp 87 is connected between line L and limit switch 42 and hence will be energized whenever said switch is closed and deënergized upon tripping thereof while the lamp 88 is connected between line L and limit switch 41 to be controlled thereby in the same manner. Thus energization of both lamps 87 and 88 will indicate closure of both limit switches and thereby indicate intermediate positioning of the valve, whereas deënergization of the lamps will indicate opening of their respective limit switches and thereby indicate positioning of the valve at corresponding limits.

In practice it may in some instances be desirable to operate the pawl 30 electromagnetically instead of mechanically as above described, and Fig. 7 illustrates such control of said pawl. This figure shows the pawl equipped with two operating solenoids 89 and 90, the former serving to rock the same to the left and the latter serving to rock it to the right. These solenoids have a common connection 91 to line L and have independent connections to auxiliary contacts of the limit switches. Solenoid 89 is connected by conductor 92 to a contact 93 adapted to be bridged with a contact 94 by a contact 95 carried by and insulated from the lever of switch 41. The contact 94 is connected with the main stationary contact of the limit switch and the arrangement is such that contact 95 will bridge contacts 93 and 94 as the limit switch moves to open position but prior to disengagement of its main contacts. The solenoid 90 is connected by conductor 96 to similar auxiliary contacts of limit switch 42 and the control system is otherwise identical with that illustrated in Fig. 6. It will thus be apparent that each limit switch when actuated by the member 40 will first energize its respective solenoid to shift the pawl 30 and then immediately deënergize such solenoid and interrupt the motor circuit with the same results as those above described.

In practice it may also be desirable in some instances to substitute a reciprocating plug for the pawl 30 and Fig. 8 shows such a modification. This figure schematically illustrates a plug 97 having a spring 98 to project the same into the groove of the ring 26 of the planetary gear and an electromagnetic winding 99 to withdraw the same from said groove, said winding being jointly controlled by the limit switches and the controller 70. The limit switches have auxiliary contacts like those of Fig. 7 and the controller 70 is of the construction described with the addition of end contacts 100 and 101 and the extension of segments 76 and 79 to respectively engage said added contacts. The winding 99 has one terminal thereof connected by conductor 102 to line L and has its opposite terminal connected by parallel branches to contacts 100 and 101 through the auxiliary contacts of limit switches 41 and 42 respectively. The arrangement is such that with the controller 70 in the position shown tripping of the limit switch 41 will complete circuit from line L through the winding 99 by conductor 103 through the auxiliary contacts of limit switch 42, by conductor 104 to contact 100 through segment 76 to contact 71 and thence through the main contacts of the limit switch 42 and motor field to line L'. This provides for energization of the winding 99 to withdraw the plug 97 for interruption of the mechanical drive and upon opening of the limit switch to disconnect the motor from circuit, the winding will be deënergized to permit the plug to reënter the groove with the same result as shifting of the double pawl 30. On the other hand, with the controller 70 in reverse position, tripping of the limit switch 42 will complete the circuit of winding 99 from its upper terminal by conductor 105 through the auxiliary contacts of said limit switch, by conductor 106 to contact 101 through segment 79 to contact 75 and thence through the main contacts of limit switch 41, whereby the plug will be withdrawn and then released as just described.

What I claim as new and desire to secure by Letters Patent is:

1. In a driving mechanism for valves and the like, in combination, power driving means, a driven member, a driving connection therebetween including a normally restrained member releasable to effect substantially instantaneous release of said driven member from said power means and limit means for said driven member to effect release of said normally restrained member.

2. In a driving mechanism for valves and the like, in combination, power driving means, a driven member, a driving connection therebetween including a member to be restrained to render said connection effective and to be released to render said connection ineffective substantially instantaneously and means to restrain and release said member, said restrainable member having a play relative to said means to initiate the movement of said driven member with a hammer blow.

3. In a driving mechanism for valves and the like, in combination, power driving means, a driven member, a driving connection therebetween including a member to be restrained to render said connection effective and to be released to render said connection ineffective substantially instantaneously, means to restrain and release said restrainable member, said restrainable member having a play relative to said means to initiate the movement of said driven member with a hammer blow, and limit means for said driven member automatically controlling said restraining and releasing means.

4. In a driving mechanism for valves and other devices, in combination, a driving motor, a driven member, a speed reducing gear connection therebetween including a normally restrained gear releasable to effect substantially instantaneous release of said driven member from said motor and limit means for said driven member to effect release of said restrained member.

5. In a driving mechanism for valves and the like, in combination, a driving motor, a driven member, a planetary gear driving connection therebetween, means to restrain and release one member of said planetary gear and limit means for said driven member controlling said former means to effect automatic release of said planetary gear member.

6. In a driving mechanism for valves and the like, in combination, power driving means, a driven member, an operative connection therebetween including a revoluble member and dependent for power transmission upon restraint of said revoluble member and a stop for said revoluble member operable to release the same, said revoluble member having a play relative to said stop for initiation of the operation of said driven member with a hammer blow.

7. In a driving mechanism for valves and the like, in combination, power driving means, a driven member, a planetary gear driving connection therebetween including a gear member to be restrained and released to render said connection effecitve and ineffective and a stop for said gear member movable into and out of operative relation therewith, said gear member having a rotary play relative to said stop for initiation of the operation of said driven member with a hammer blow.

8. In a driving mechanism for valves and the like, in combination, a driving motor, a driven member, a driving connection therebetween including a normally restrained member adapted upon release to render said connection ineffective and limit means for said driven member to effect release of said restrained member and to terminate the power supply of said motor.

9. In a driving mechanism for valves and the like, in combination, a driving motor, a driven member, a driving connection therebetween and limit means for said driven member to terminate the supply of power to said motor and to effect substantially simultaneously therewith disconnection of said driven member from said motor, said driving connection being thereafter rendered effective by a predetermined drift of the motor to impart a hammer blow to said driven member for final positioning thereof.

10. In a driving mechanism for valves and the like, in combination, a driving motor, a driven member, a driving connection therebetween including means operable to effect substantially instantaneous release of said driven member from said motor and reconnection of said driven member to said motor upon continued operation of the latter to a predetermined degree and limit means for said driven member controlling said former means and the power supply to said motor.

11. In a driving mechanism for valves and the like, in combination, a driving motor, a driven member, a driving connection therebetween including a member to be restrained to render said connection effective and releasable to render said connection ineffective, means to restrain and release said member of said connection, and limit means for said driven member to effect termination of the power supply to said motor and to effect substantially simultaneously therewith operation of said means to release said member but subject to subsequent restraint upon drifting of the motor to a predetermined degree to thereby impart a hammer blow to said driven member for final positioning thereof.

12. In a driving mechanism for valves and the like, in combination, a driving motor, a driven member, a driving connection therebetween including a revoluble member to be restrained to render said connection effective and releasable to render the same ineffective, a stop for said revoluble member operable to release and again restrain the same after a predetermined degree of rotation thereof and limit means for said driven member controlling said means and the continuity of the motor circuit to effect interruption of the motor circuit and operation of said means substantially simultaneously.

13. In a driving mechanism for valves and the like, in combination, a driving motor, a driven member, a planetary gear driving connection therebetween including a gear member requiring restraint for power transmission and a stop for said gear member, the latter having a play relative to the former and limit means for said driven member to interrupt the motor circuit and to effect operation of said stop for release of said gear member, the play between said gear member and said stop providing for initiation and completion of the travel of said driven member with a hammer blow.

14. In a driving mechanism for valves and the like, in combination, a reversible driving motor, a driven member, a planetary gear driving connection therebetween including a gear member to be locked and released to render said connection effective and ineffective and a coöperating locking device normally permitting limited rotation of said gear member in one direction and operable to permit limited rotation of said gear member in the reverse direction and limit means for said driven member controlling the continuity of circuit of said motor and the operation of said locking device.

15. A unitary driving mechanism for valves and other devices comprising a driven member, a relatively high speed driving motor, a speed reducing driving connection therebetween including means to render the same ineffective substantially instantaneously and limit means for said driven member controlling said means.

16. A unitary driving mechanism for valves and other devices comprising a driven member, a relatively high speed driving motor, a speed reducing driving connection therebetween including means to render the same ineffective substantially instantaneously and limit means for said driven member controlling both the continuity of circuit of said driving motor and the operation of said means.

17. In a driving mechanism for valves and the like, in combination, a driven member, power driving means, a driving connection therebetween including a connecting member to be restrained and released to render said connection effective and ineffective for power transmission, means providing for manual drive of said driven member upon release of said connecting member and a restraining device for said connecting member, said device being adapted to be set to release said connecting member for manual drive of said driven member.

18. In a driving mechanism for valves and the like, in combination, power driving means, a driven member, a driving connection therebetween including a member to be respectively restrained and released to render said connection effective and ineffective, a restraining device for said last mentioned member and mechanical tripping means for said device operable by said driven member.

19. In a driving mechanism for valves and the like, in combination, power driving means, a driven member, a driving connection therebetween including a member to be respectively restrained and released to render said connection effective and ineffective, a restraining device for said last mentioned member and tripping means for said device including a relatively slow moving part operated by said driven member and means to effect a relatively quick trip of said device upon predetermined positioning of said part.

20. In a driving mechanism for valves and the like, in combination, reversible power driving means, a driven member, a driving connection therebetween including a member to be restrained to effect drive of said driven member in a direction corresponding to that of said driving means and to be released for substantially instantaneous release of said driven member and a plurality of stops for said restrainable member adapted by selective use thereof to provide for play and restraint of said restrainable member such as to provide for initiation and completion of the movement of said driven member in reverse directions with hammer-like blows.

21. In a driving mechanism for valves and the like, in combination, reversible power driving means, a driven member, a driving connection therebetween including a member to be restrained to effect drive of said driven member in a direction corresponding to that of said driving means and to be released for substantially instantaneous release of said driven member, a plurality of stops for said restrainable member, each permitting a limited play of said restrainable member and means providing for automatic setting and tripping of said stops whereby said restrainable member will tend to initiate and complete the movement of said driven member in opposite directions with hammer-like blows.

In witness whereof, I have hereunto subscribed my name.

PETER P. DEAN.